(12) United States Patent
Mulqueen et al.

(10) Patent No.: US 9,505,984 B2
(45) Date of Patent: Nov. 29, 2016

(54) METHOD AND APPARATUS FOR CONTINUOUS PRODUCTION OF CARBONACEOUS PYROLYSIS BY-PRODUCTS

(75) Inventors: Daniel W. Mulqueen, Denver, CO (US); James L. Fournier, Nicasio, CA (US); Thomas B. Reed, Barre, MA (US)

(73) Assignee: Carbon Research & Development, Co., Daytona Beach Shores, FL (US)

( * ) Notice: Subject to any disclaimer, the term of this patent is extended or adjusted under 35 U.S.C. 154(b) by 568 days.

(21) Appl. No.: 13/102,014

(22) Filed: May 5, 2011

(65) Prior Publication Data
US 2011/0278150 A1 Nov. 17, 2011

Related U.S. Application Data

(60) Provisional application No. 61/331,788, filed on May 5, 2010.

(51) Int. Cl.
C10B 49/02 (2006.01)
C10B 53/02 (2006.01)
(Continued)

(52) U.S. Cl.
CPC ............... *C10B 53/02* (2013.01); *C05D 9/00* (2013.01); *C05F 11/02* (2013.01); *C10B 49/02* (2013.01); *C10B 49/08* (2013.01); *C10B 49/16* (2013.01); *C10B 57/02* (2013.01); *Y02E 50/10* (2013.01);
(Continued)

(58) Field of Classification Search
CPC ....... C10B 49/02; C10B 49/04; C10B 49/08; C10B 49/16; C10B 53/02; C10B 57/02; C05D 9/00; C05F 11/02

USPC .......... 201/36, 4, 27, 29, 32, 33, 34, 37, 41; 202/85, 61, 62, 63, 96, 99, 117, 118; 48/61, 76, 89, 209; 110/257, 315, 316
See application file for complete search history.

(56) References Cited

U.S. PATENT DOCUMENTS 3,746,521 A * 7/1973 Giddings ........................ 48/209
3,901,766 A * 8/1975 Smith ............................. 201/32
(Continued)

FOREIGN PATENT DOCUMENTS

WO WO2009/124359 * 10/2009

OTHER PUBLICATIONS

PCT/US2011/035432 International Preliminary Report on Patentability and Written Opinion dated Nov. 6, 2012.
(Continued)

*Primary Examiner* — Jill Warden
*Assistant Examiner* — Joye L Woodard
(74) *Attorney, Agent, or Firm* — Glenn H. Lenzen; Dietze and Davis, P.C.

(57) ABSTRACT

The invention provides scalable, modular, mobile systems and methods for the continuous on-site production of carbonaceous pyrolysis by-products having physical properties which may be tailored for specific market requirements. The system includes at least on scalable modular unit having a primary reaction chamber, an input aperture for introducing biomass feedstock and atmosphere into the reaction chamber, an external heat source for initiating an exothermic pyrolysis reaction therein, an internal mechanism for controllably agitating the feedstock, atmosphere and pyrolysis by-products to sustain the reaction at a preselected operating temperature range, and an apparatus for removing the by-products from the systems.

26 Claims, 7 Drawing Sheets

(51) Int. Cl.
  *C05D 9/00* (2006.01)
  *C05F 11/02* (2006.01)
  *C10B 49/08* (2006.01)
  *C10B 49/16* (2006.01)
  *C10B 57/02* (2006.01)

(52) U.S. Cl.
  CPC ............... *Y02E 50/14* (2013.01); *Y02E 50/30* (2013.01); *Y02P 30/20* (2015.11)

(56) References Cited

U.S. PATENT DOCUMENTS

| | | | | |
|---|---|---|---|---|
| 4,056,461 A | * | 11/1977 | Unverferth | 202/117 |
| 4,308,103 A | * | 12/1981 | Rotter | 202/117 |
| 4,501,644 A | * | 2/1985 | Thomas | 202/99 |
| 4,530,702 A | * | 7/1985 | Fetters | C10J 3/02 48/209 |
| 5,961,786 A | | 10/1999 | Freel et al. | |
| 6,398,921 B1 | | 6/2002 | Moraski | |
| 2002/0148716 A1 | * | 10/2002 | Murcia | 202/83 |
| 2004/0182001 A1 | | 9/2004 | Masemore et al. | |
| 2008/0128259 A1 | * | 6/2008 | Kostek et al. | 202/118 |
| 2008/0147241 A1 | * | 6/2008 | Tsangaris et al. | 700/273 |
| 2008/0202028 A1 | | 8/2008 | Tsangaris et al. | |
| 2008/0222956 A1 | | 9/2008 | Tsangaris et al. | |

OTHER PUBLICATIONS

PCT/US2011/035432 International Search Report and Written Opnion dated Jan. 2, 2012.

* cited by examiner

METHOD AND APPARATUS FOR CONTINUOUS PRODUCTION OF CARBONACEOUS PYROLYSIS BY-PRODUCTS

CROSS REFERENCE TO RELATED APPLICATIONS

This application claims the benefit or U.S. Provisional Patent Application No. 61/331,788 filed May 5, 2010, which is incorporated herein by reference in its entirety as if fully set forth herein.

FIELD OF THE INVENTION

The present invention relates generally to a method and apparatus for the continuous production of carbonaceous pyrolysis by-products. More particularly, the present invention relates to a method and apparatus for the production of biochar and gaseous by-products from biomass and other feedstock materials.

BACKGROUND OF THE INVENTION

Biochar, more commonly known simply as charcoal, is the solid carbon residue which results from the pyrolysis of various biomass feedstocks such as carbonaceous materials having a cellulosic fibrous structure. Such materials include various types of wood, vegetable biomass, tree bark, paper, paperboard, cardboard, certain waste products, and the like. Pyrolysis is the chemical transformation or decomposition of chemical compounds caused by heat. It occurs spontaneously at sufficiently high temperatures, typically in the range of 300° to 800° C., and produces certain by-products such as carbonized biomass, combustible gases and volatile organic compounds (VOC's) known as tars.

Pyrolysis has been used for centuries as a method for producing carbonized materials. The process is typically carried out in a kiln or in a retort. A kiln is a thermally insulated chamber in which the oxygen available for combustion is restricted. A retort is almost as simple as the kiln, involving an outer space where pyrolysis products are burned providing energy to a central space where biomass is pyrolysed without oxygen. Both the kiln and retort are simple to construct but time intensive to produce char, and both require loading and unloading between production cycles. Moreover, without adequate flaring or burn-off of gaseous by-products, these methods can produce a large amount of air pollutants.

Two primary methods for pyrolysis exist that pertain to producing biochar-fast pyrolysis and slow pyrolysis. A number of other methods, such as microwave pyrolysis and vacuum pyrolysis, exist but are not directly relevant to this application. Although pyrolysis has been the leading producer of biochar, the focus of most pyrolysis operations has been to produce pyrolysis gases and/or oils with charcoal as a byproduct for use as a fuel or agricultural amendment.

Because fast and slow pyrolysis requires an oxygen free environment, the process must be carried out in a closed vessel. When the vessel fills with pyrolysis gas (primarily $H_2$, $CO_2$ and $CH_4$) a significant explosion hazard is created which demands a higher engineering and production cost to ensure the safety of personnel working with the equipment. In addition, one of the primary by-products of pyrolysis is an oil composed of various compounds including high percentages of oxygenated hydrocarbons and poly-nuclear aromatics. These oils can be hazardous to tissues and represent a substantial environmental hazard.

The art is replete with examples of apparatus for producing charcoal. An early example is U.S. Pat. No. 757,939 issued Apr. 19, 1904 to Mackie for "Apparatus for the distillation of Wood." Mackie discloses an inclined retort contained within a kiln and adapted for pyrolysis of wood. The retort includes a drain pipe at one end thereof for collecting the pyrolysis by-products and condensing them in a suitable collector. However, as can be seen from the configuration of the system, it is a batch-type operation which requires loading, sealing, heating, unsealing and unloading the retort-a very time consuming process.

Another example is found in U.S. Pat. No. 6,790,317 issued Sep. 14, 2004 to Anatal for "Process for Flash Carbonization of Biomass." Anatal discloses a process for the low energy input pyrolytic conversion of biomass in an atmosphere of pressurized air. Again, the process is not continuous, and requires of loading and unloading of material between cycles. Moreover, the process disclosed by Anatal produces a product charcoal that has a higher content of volatiles than a biochar produced at atmospheric pressure.

Considerable work has gone into the improvement of production systems and techniques for manufacturing a fuel gas for use in the generation of heat or electricity. Biomass gasification is the process of thermally decomposing organic material into a combustible gas composed primarily of $H_2$ and $CO_2$ with a mixture of $CH_4$, higher hydrocarbons and nitrogen. For example, U.S. Pat. No. 4,583,992 issued Apr. 22, 1986 to Rogers discloses a system for the co production of gas and charcoal for heating. Co-production relies on a rotating grate at the bottom of the reactor to pulverize char and support the reaction, the inclusion of ceramic balls at the grate, and the introduction of air through rotating tuyeres. The focus of Rogers' system is on increasing the heating value of the input feedstock by decomposition into gas and charcoal.

U.S. Pat. No. 6,647,903 issued Nov. 18, 2003 to Ellis discloses a co-current downdraft gasifier system for the gasification of biomass and charcoal. Nonetheless, the apparatus of Ellis' invention is not focused on the production of charcoal, but rather on the introduction of oxygen into the region of hot charcoal to increase temperatures above 1000° C., thereby destroying volatile hydrocarbons in the produced gas. This system consumes the majority of char produced in order to produce a low tar gas. At the same time, input material must be of a well controlled size and moisture, along with being free of rocks or sand. Because of high reactor temperatures, the material of construction must be specified to withstand high heat.

The primary goal of gasification has been to produce a fuel gas for use in the generation of heat or electricity. While chars have been produced by gasification systems in the past, it has been a considered waste product, and substantial work has been done to reduce the percentage of char produced by a gasification unit. Further, the char produced by gasification units is generally intended to be used as a fuel and is made at a higher temperature than the temperature required to manufacture char for use as an agricultural amendment, thereby wasting fuel resources. Accordingly, it would be advantageous to develop a gasification system and methodology which would result in a char that can be used not only as an agricultural amendment, but which also possess physical properties such as energy content, ash content and friability that would allow it to serve as a coal substitute.

While gasification systems are able to accept a wide variety of materials, there are few operational systems that can run well for continued periods of time on a broad range of input material. Frequently feedstocks for gasification require substantial cleaning and screening before they can be used in the system. Feedstock materials must also be dried thoroughly due to gasifiers' limited capabilities to deal with moisture above 7-10%. Because gasification occurs at temperatures above 800° C. and frequently above 1100° C., gasification equipment construction materials must withstand elevated temperatures, substantially increasing gasification system engineering and construction costs.

Air quality is also a primary concern. Frequently, especially in small scale operations or in retorts, the pyrolysis process produces a large mass of gases that can be considered air pollutants, specifically $CH_4$ and higher hydrocarbons. If these gases are not properly combusted, they can present a significant air quality and greenhouse gas risk. Many gasification and pyrolysis units are operated either at such a small scale (camp stoves, two barrel retort) that production of a substantial amount of char for a commercial user is impractical or at such a large scale that feedstocks must be transported over substantial distances to the processing facility. At the end of the production cycle, the carbonized material must also be transported to the end use site. In such cases, the materials transportation costs quickly become prohibitively expensive, or the $CO_2$ emissions of transportation become larger than the carbon sequestered by the end product.

In view of the foregoing, it is apparent that a need exists for a process and apparatus which is capable of safely, economically and continuously producing carbonaceous and gaseous pyrolysis by-products for soil amendment, fuel and other applications from a wide variety of feedstocks and which can be transported to sites where the feedstock can be collected or to sites where the biochar may be needed, or both.

SUMMARY OF THE INVENTION

It is an object of the present invention to provide a method and apparatus to accomplish pyrolysis though partial or incomplete gasification while being open to the atmosphere.

Another object of the present invention is to provide a method for the production of carbonaceous pyrolization by-products that is superior to previously know methods in manufacturing and operating costs, operator safety, end product uniformity and quality, adaptability to a wide range of input feedstock materials, environmental impact and system size and mobility.

Still another object of the present invention is to provide a carbonized biomass/biochar production and gasification method and apparatus which is able to accept a wide variety of biomass inputs that may vary in particle size, density, moisture content and chemical composition, thereby allowing for a greater range of feedstocks to be used with a substantially reduced need for material pre-treatment such as drying, cleaning and screening.

Another object of the present invention is to provide a method for the production of carbonized biomass and gaseous pyrolysis by-products in which process operating conditions and inputs may be selectively varied to produce a final product possessing a desired set of physical properties.

Yet another object of the present invention is to provide a carbonized biomass production and gasification method and apparatus having a substantially reduced waste stream as compared to conventional pyrolysis methodologies and systems.

A further object of the present invention is to provide a carbonized biomass production and gasification system which can be easily moved to and deployed in an area where available feedstock and/or a need for biochar exists, thereby significantly reducing or even eliminating transportation costs from an installation.

Another object of the present invention is to provide a carbonized biomass production and gasification method and apparatus which are open to the atmosphere, thereby significantly reducing the risk of explosion.

Yet another object of the present invention is to provide a carbonized biomass production and gasification method and apparatus having reactor operating temperatures in the range of 250° C. to 700° C. in an environment where oxygen is available, thereby reducing engineering and production costs, improving system reliability, and increasing the threshold for personal safety of individuals working with the equipment.

Another object of the present invention is to provide a carbonized biomass production and gasification method and apparatus which may be scaled up or down or provided in modular units for specific market applications.

A further object of the present invention is to provide a biochar material for use as an agricultural amendment and in reforestation, grass and tree preservation, desertification abatement, water retention and carbon sequestration applications.

Yet another objective of the present invention is to produce a carbonaceous pyrolysis by-product material which possess properties similar to those possessed by coal such that the by-product may be substituted for coal in coal burning systems.

Another object of the present invention is to provide a biochar material in a pelletized, granular or powder form to which accelerants, biological materials, nutrients and other additives may be added to create a blended product suitable for selected applications.

These and other objects, advantages and novel features of the present invention will become apparent from the following description of the invention when considered in conjunction with the accompanying drawings.

DESCRIPTION OF THE PREFERRED EMBODIMENTS

It should be noted that the present description is by way of instructional examples, and the concepts presented herein are not limited to use or application with any single biomass production and gasification method and/or apparatus. Hence, while the details of the innovation described herein are for the convenience of illustration and explanation with respect to exemplary embodiments, the principles disclosed may be applied to other types and applications of biomass production and gasification methods and apparatus without departing from the scope hereof.

Figure 1:
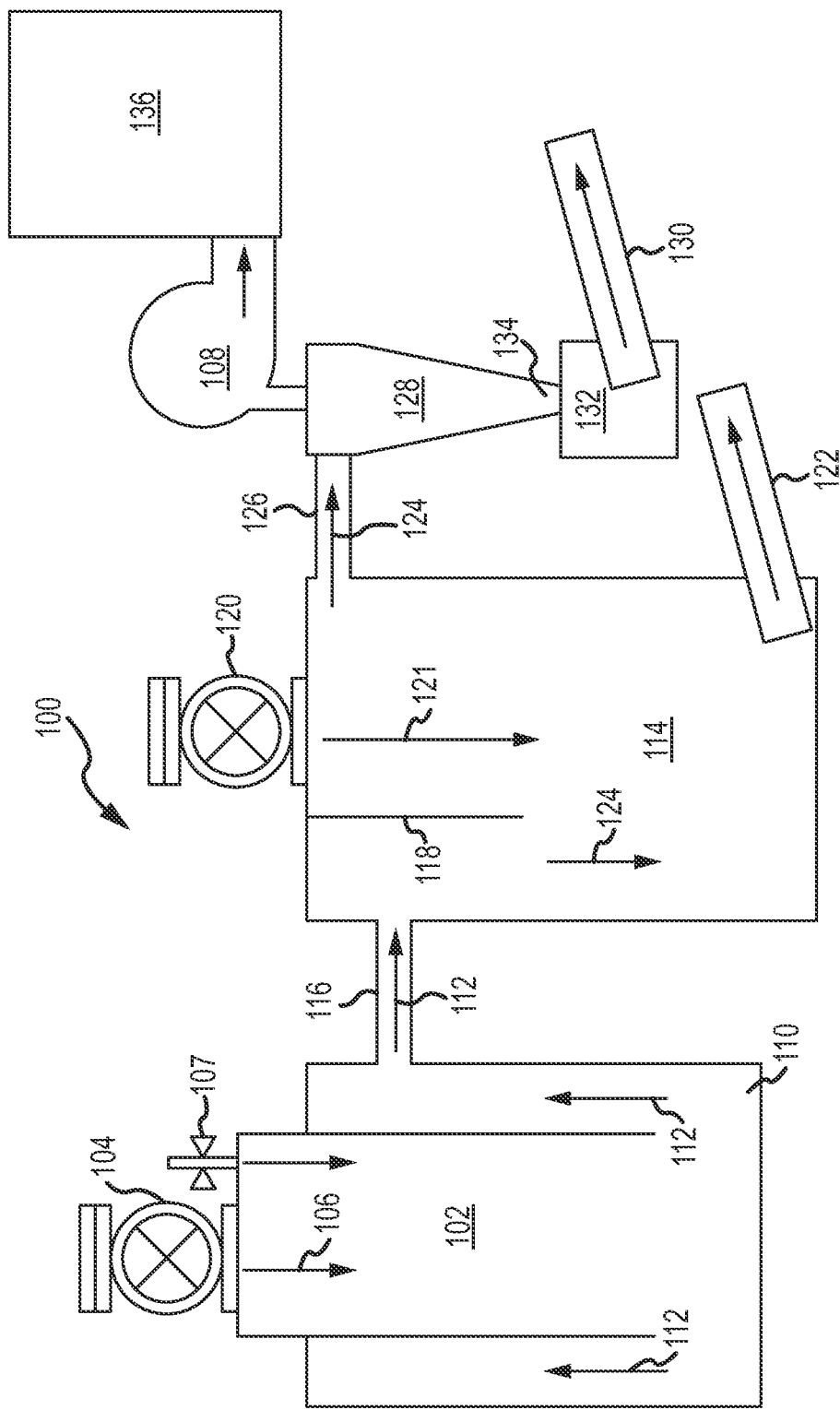
FIG. 1 is a schematic view of the apparatus of the present invention in accordance with an embodiment.

The System:

Referring now to FIG. 1, a system for the continuous production of carbonaceous and gaseous pyrolysis by-products is illustrated generally at 100. For purposes of simplification and the reader's convenience, the terms "biochar", "char" or "charcoal" will be used herein interchangeably for the term "carbonaceous pyrolysis by-product or by-products". The system includes a primary pyrolysis/reaction chamber or reactor 102 adapted to receive biomass feedstock via a mechanical airlock 104. By way of example and not of limitation, the feedstock may be comprised of woody biomass, plant material, animal waste, recycled food waste, composted material, and the like, composed primarily of organic matter which may vary in particle size, density, and chemical composition. The novel design of the apparatus of the present invention permits the use of a greater range of feedstocks than can be used with conventional prior art reactors, thereby also substantially reducing the need for material pre-treatment such as cleaning and screening. The system will also function on a wider range of input moisture than conventional gasification apparatus, with only a modest reduction in efficiency. Moreover, the moisture range of the feedstock may be controlled as desired by applying preselected preprocessing techniques prior to introducing the feedstock to the reaction chamber. The feedstock is fed continuously to the airlock 104 in a controlled manner by means of a belt conveyor, a screw feed mechanism or similar feed system (not shown), as is known in the art. The force of gravity then draws the feedstock through the airlock in a direction indicated by arrow 106 into the reaction chamber 102. The reaction chamber is held at a negative pressure by a blower 108 which pulls atmospheric air into the reaction chamber through a control valve 107. The amount of oxygen in the primary reactor 102 can be controlled by the rate at which the blower 108 pulls gas through the system and also by controlling the amount of air that is introduced to the system via control valve 107. While running a reactor that is open to the atmosphere is desired in many cases, the reactor can operate in a condition where material is introduced through a mechanical airlock and input oxygen is controlled through a separate valve. Additional gas flow for gas disengagement of the carbonized material may be taken from the positive pressure side of the blower, re-circulating a portion of the produced gas to provide the necessary flow to motivate particles.

As the biomass material passes through the airlock, the pyrolyzation process is initiated by exposing the material/atmospheric air mixture to a heat source such as an electric or gas-fired heating element of sufficient temperature to initiate the reaction. Thereafter, as will be discussed in greater detail below, the process becomes self-sustaining via the exothermic release of energy in the reactor.

The feedstock reacts within the reaction chamber 102 to form a pyrolysis gas mixture and charcoal, which are controllably mixed pulled out of the chamber by the suction force created by the blower 108 through a gas disengagement space 110 in the direction of the arrows 112. The gas disengagement space can be any region after material has been carbonized in which pyrolysis gases and charcoals are removed from the pyrolysis reactor or reaction chamber 102. One effective example is an annular space 110 around the reactor sized such that the velocity of the exiting pyrolysis gas is high enough to entrain carbonized material. In this case the area of the gas disengagement space is important to controlling the rate at which material is removed. The desired area will depend on the density of the final product. For pine wood biochar, areas of approximately 550-300 in$^2$ have been successful for a lift of no more than 12 inches. Alternatively, as will be described in greater detail below, by locating the gas disengagement area annularly around the carbonization reactor and insulating the outer wall with a refractory shielding, material can be removed evenly from the reactor and process heat can be contained in the reaction space for peak operating efficiency The disengagement space is structured and arranged to prevent the removal of un-carbonized biomass, and the charcoal and pyrolysis gas mixture are directed into a gas-tight collection chamber or drop box 114 via connector 116. As the carbonized material enters the drop box, it impinges upon the surface of baffle 118, which improves particle separation by abruptly changing the direction of the flow of the material. Drop box 114 also acts as a secondary reactor, and additional biomass may be introduced thereto via a second mechanical airlock 120 in a direction indicated by arrow 121 where it will be decomposed into a low temperature char. The coarse particles of carbonized material are removed from the drop box by an air-tight screw conveyor or auger 122, by way of example; however, it is to be understood that other suitable material removal mechanisms may be used without departing from the scope of the present invention.

Fine carbonized particles are drawn by the suction force of blower 108 in the stream of pyrolysis gas in the direction of arrows 124 into connecting member 126 which directs the fines into a gas-tight cyclone 128. A second air-tight material removal mechanism 130, by way of example, a screw conveyor or auger system, as hereinabove described with respect to the drop box, removes the fine carbonized biochar from a collector 132 positioned at the vortex 134 of the cyclone, and the pyrolysis gas is directed by the blower into a flare or terminal oxidizer or combustion chamber 136 where it may be burned with atmospheric air to generate a clean exhaust. Alternatively, a portion or substantially all of the gas may be redirected to the reaction chamber 102, where it may be employed as a fuel to initiate the reaction process or as an energy source for drying the feedstock.

Figure 2:
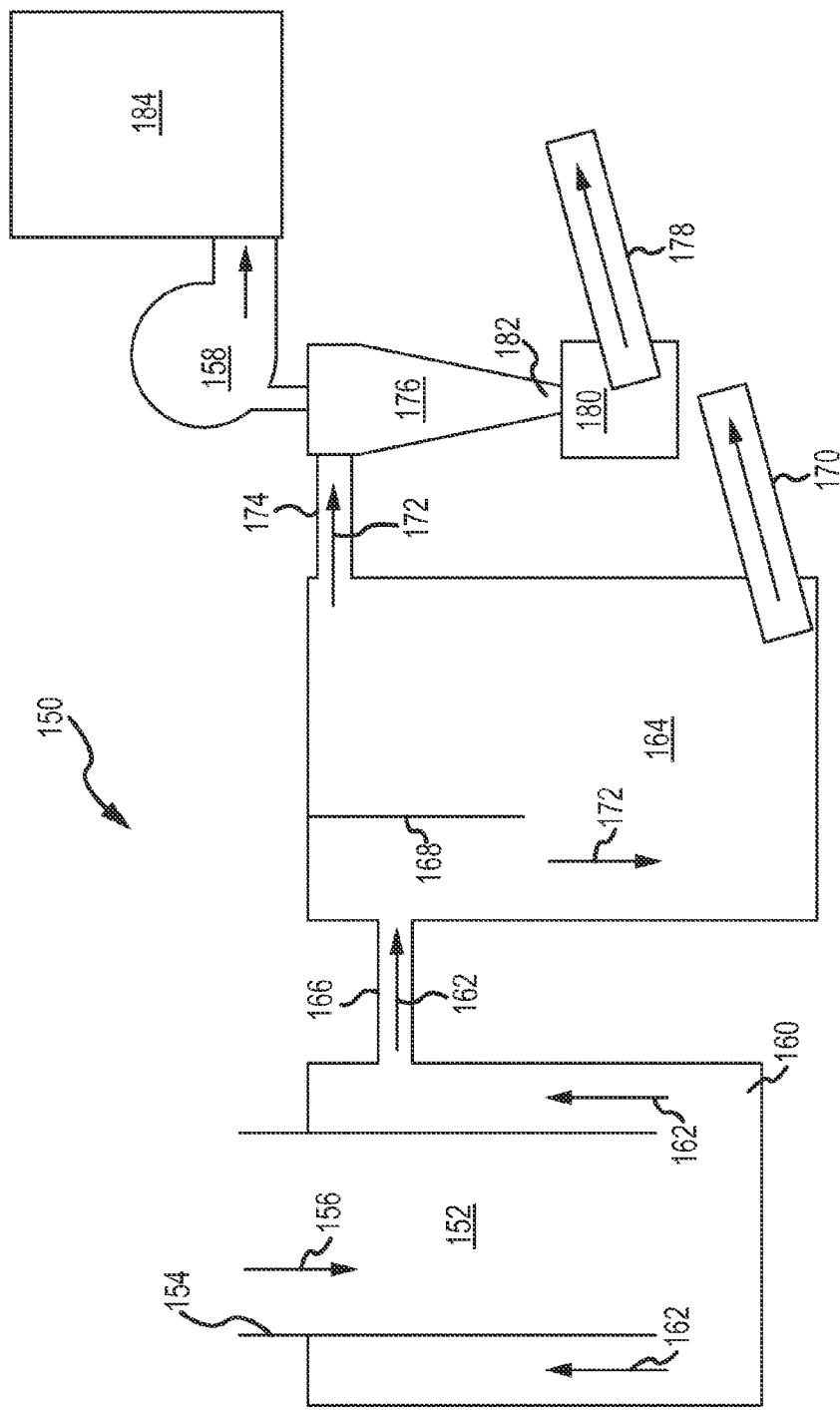
FIG. 2 is a schematic view of the apparatus of the present invention in accordance with another embodiment.

Referring now to FIG. 2, a system for the continuous production of biochar and gasification by-products in accordance with another embodiment of the present invention is illustrated generally at 150. Similar in construction and operation of the embodiment of FIG. 1, system 150 includes a pyrolysis/reaction chamber or reactor 152 adapted to receive biomass feedstock via input aperture 154. The feedstock is fed continuously to the aperture 154 by means of a belt conveyor, a screw feed mechanism or similar feed system (not shown), as is known in the art. The force of gravity then draws the feedstock through the aperture in a direction indicated by arrow 156 into the reaction chamber. Blower 158 pulls atmospheric air into the reaction chamber, and, as the biomass material passes through the aperture, the pyrolyzation process is initiated by exposing the material/atmospheric air mixture to a heat source such as an electric or gas-fired heating element of sufficient temperature to initiate the reaction. Thereafter, as discussed above, the process becomes self-sustaining via the exothermic release of energy in the reactor.

The feedstock reacts within the reaction chamber 152 to form a pyrolysis gas mixture and charcoal, which are controllably mixed and pulled out of the chamber by the suction force created by the blower 158 through a gas disengagement space 160 in the direction of the arrows 162. The disengagement space is structured and arranged to prevent the removal of un-carbonized biomass, and the charcoal and pyrolysis gas mixture are directed into a gas-tight collection chamber or drop box 164 via connector 166. As the carbonized material enters the drop box, it impinges upon the surface of baffle 168, which improves particle separation by abruptly changing the direction of the flow of the material. The coarse particles of carbonized material are removed from the drop box by an air-tight screw conveyor or auger 170, by way of example; however, it is to be understood that other suitable material removal mechanisms may be used without departing from the scope of the present invention.

Fine carbonized particles are drawn by the suction force of blower 158 in the stream of pyrolysis gas in the direction of arrows 172 into connecting member 174 which directs the fines into a gas-tight cyclone 176. A second air-tight material removal mechanism 178, by way of example, a screw conveyor or auger system, as hereinabove described with respect to the drop box, removes the fine carbonized biochar from a collector 180 positioned at the vortex 182 of the cyclone, and the pyrolysis gas is directed by the blower into a combustion chamber 184 where it may be burned with atmospheric air to generate a clean exhaust. Alternatively, a portion or substantially all of the gas may be redirected to the reaction chamber 152, where it may be employed as a fuel to initiate the reaction process or as an energy source for drying the feedstock.

Figure 3:
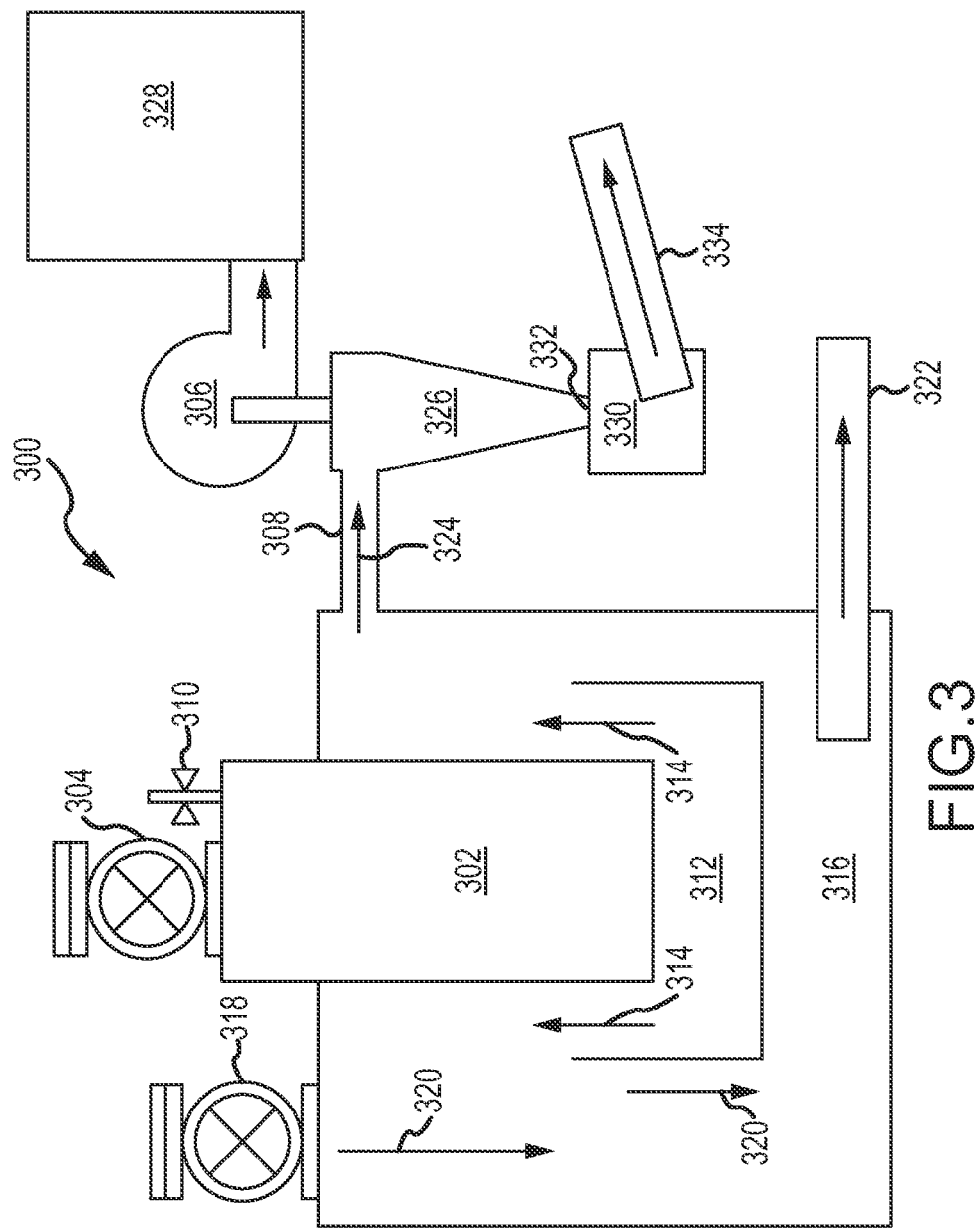
FIG. 3 is a schematic view of the apparatus of the present invention in accordance with still another embodiment.

Referring now to FIG. 3, a system for the continuous production of biochar and gasification by-products in accordance with another embodiment of the instant invention is illustrated generally at 300. System 300 includes a primary pyrolysis/reaction chamber or reactor 302 adapted to receive biomass feedstock via a mechanical airlock 304. Reactor 302 is maintained at a negative pressure by a blower 306 which is in communication therewith via a connector 308. The blower pulls atmospheric air into the chamber via control valve 310 and generates gaseous flow in the chamber which assists in controllably mixing the feedstock and atmosphere in the same manner as hereinabove described with respect to the embodiment of FIG. 1. The feedstock reacts within the reaction chamber 302 to form a pyrolysis gas mixture and charcoal. The char is removed from the chamber via mechanical action or stirring through an overflow space 312 in the direction of arrows 314 into an annular secondary reactor 316. Additional biomass may be selectively introduced into the secondary reactor via a second mechanical airlock 318 in the direction of arrows 320 where it decomposes into low temperature char. The char is removed from the reactor 316 by an airtight screw conveyor or auger 322.

The gas mixture and any fine particulate matter suspended therein is pulled out of the chamber through the overflow space 312 in the direction of arrows 314 into the connector 308 in the direction of arrow 324 by the suction force created by the blower 306. Connector 308 directs the gas into a cyclone 326 which separates pyrolysis gases and fine particles before the gases are burned in a thermal oxidizer or combustion chamber 328. The fine particles are collected in a drop box or collector 330 at a vortex 332 of the cyclone and removed by an airtight screw conveyor or auger system 334.

Figure 4:
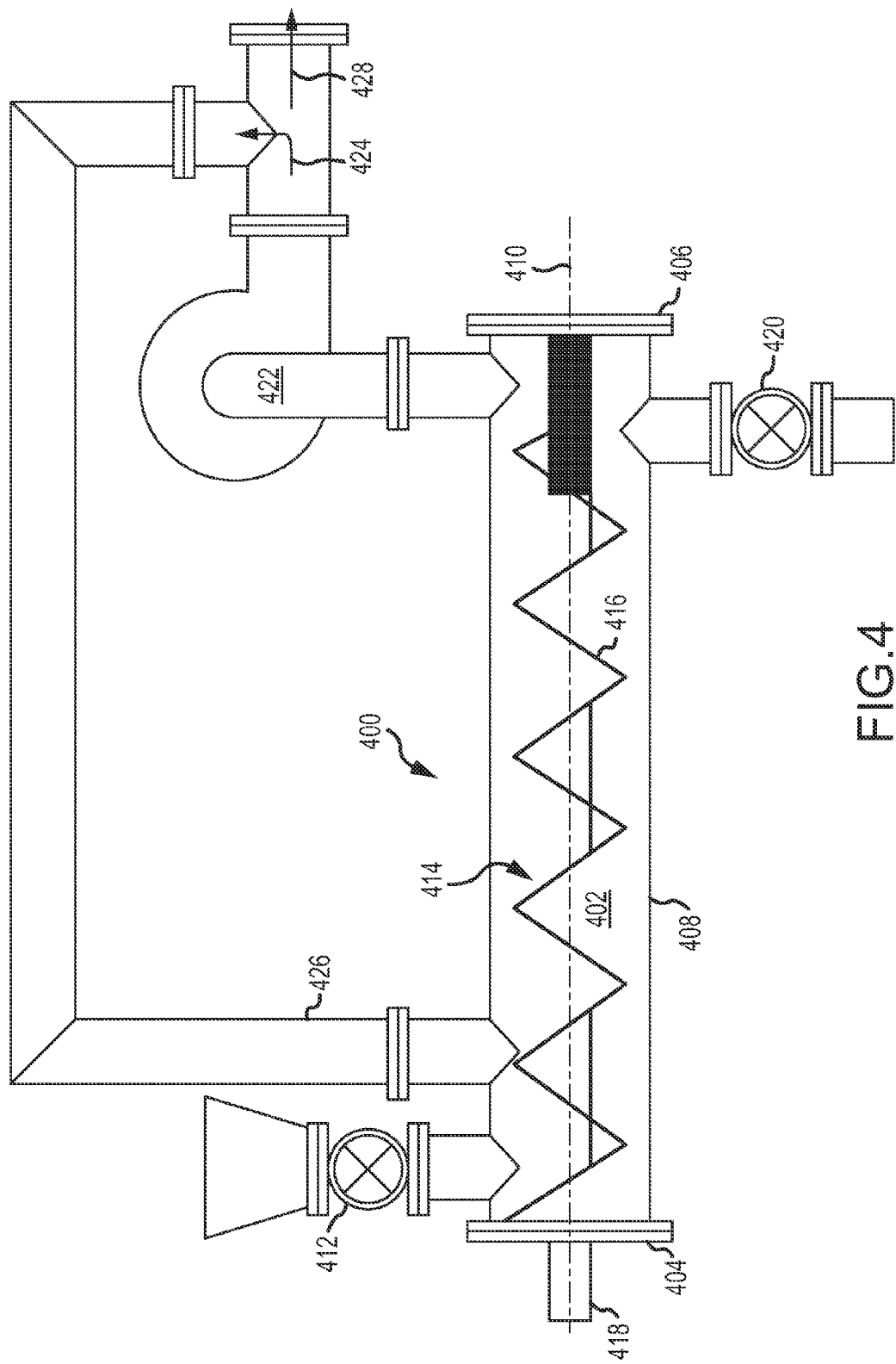
FIG. 4 is a schematic view of the apparatus of the present invention in accordance with yet another embodiment.

Referring now to FIG. 4, yet another embodiment of the continuous biochar production apparatus of the present invention is illustrated generally at 400. The apparatus includes a primary reaction chamber or reactor 402 having a first end portion 404, a second end portion 406 and a body portion 408 formed intermediate the first and second end portions and extending generally circumferentially around an axis or centerline 410. A mechanical airlock 412 is mounted to the first end portion of the reactor and is adapted to receive and introduce biomass into the reaction chamber 402. A centerless screw auger or conveyor 414 is rotatably mounted in the reactor chamber extending substantially coaxially through the body portion 408 intermediate the end portions 404/406 thereof and includes a plurality of flights 416 structured and arranged to optimize the agitation and transfer of biochar from one end of the reactor to the other, thereby enhancing reaction and end product production efficiencies. Control valve 418 is mounted on the first end portion 404 of the chamber and is adapted to deliver a selectively controllable stream of air along the axis 410 of the chamber which cooperates with recirculated pyrolysis gases to heat feedstock material and to further enhance the efficiency of the pyrolysis reaction. The pyrolysis reaction may be further controlled by selectively adjusting the input velocity or flow rate of the air stream.

Biochar is removed through a mechanical air lock 420 for either further processing or use in suitable applications in its present form. Gaseous by-products of the reaction are removed by suction of a blower 422, the gas stream being then divided into two separate streams; stream 424 which is redirected back into the reaction chamber 402 via conduit 426, and stream 428, which is either burned off or collected for fuel or other applications. The blower also assists in controllably mixing the feedstock and atmosphere.

Figure 5:
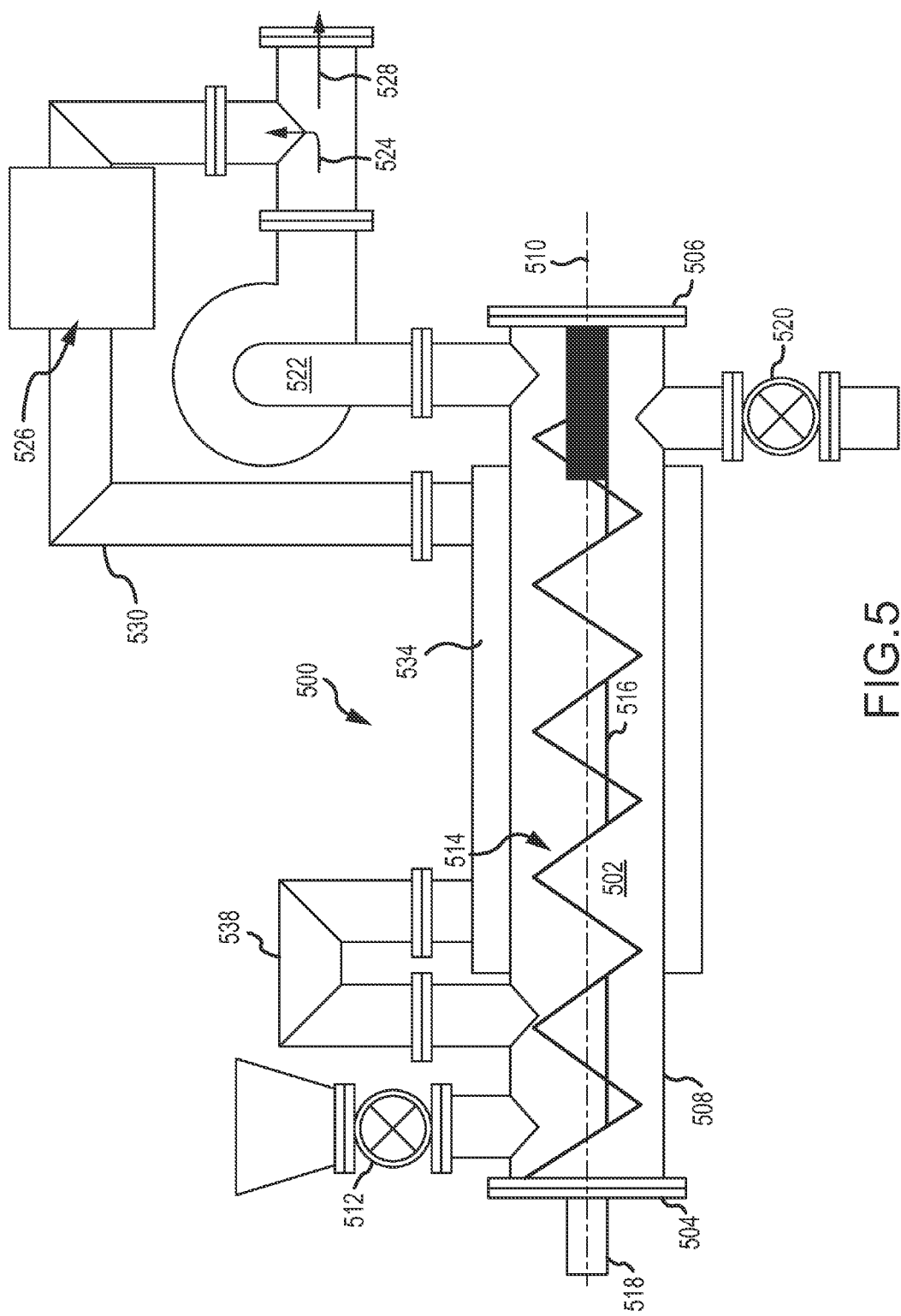
FIG. 5 is a schematic view of the apparatus of the present invention in accordance with an embodiment.

Another embodiment of the apparatus of the present invention is illustrated generally by the numeral 500 in FIG. 5. The apparatus is similar in construction to the apparatus of the embodiment of FIG. 4 and includes a primary reaction chamber or reactor 502 having a first end portion 504, a second end portion 506 and a body portion 508 formed intermediate the first and second end portions and extending generally circumferentially around an axis or centerline 510. A mechanical airlock 512 is mounted to the first end portion of the reactor and is adapted to receive and introduce biomass into the reaction chamber 502. A centerless screw auger or conveyor 514 is rotatably mounted in the reactor chamber extending substantially coaxially through the body portion 508 intermediate the end portions 504/506 thereof and includes a plurality of flights 516 structured and arranged to optimize the agitation and transfer of biochar from one end of the reactor to the other, thereby enhancing reaction and end product production efficiencies, as hereinabove described. Control valve 518 is mounted on the first end portion 504 of the chamber and is adapted to deliver a stream of air along the axis 510 of the chamber which cooperates with recirculated pyrolysis gases to heat feedstock material and to further enhance the efficiency of the pyrolysis reaction.

In a manner similar to that described above with respect to the embodiment of FIG. 4, biochar is removed through a mechanical air lock 520 for either further processing or use in suitable applications in its present form. Gaseous by-products of the reaction are removed by suction of a blower 522, the gas stream being then divided into two separate streams—stream 524 which is fully combusted in an enclosed, controlled chamber 526, and stream 528, which is either burned off or collected for fuel or other applications.

The blower also assists in controllably mixing the feedstock and atmosphere. The high temperature combusted gas is delivered, through conduit 530 to a shell 534 around the reactor 502 so that heat from the combusted gas can transfer through the body portion 508 into the reactor 502. Gases from the shell 534 are directed into the reactor 502 through conduit 538. The flow of all gases though the system is actively controlled by valves in the gas stream.

Figure 6:
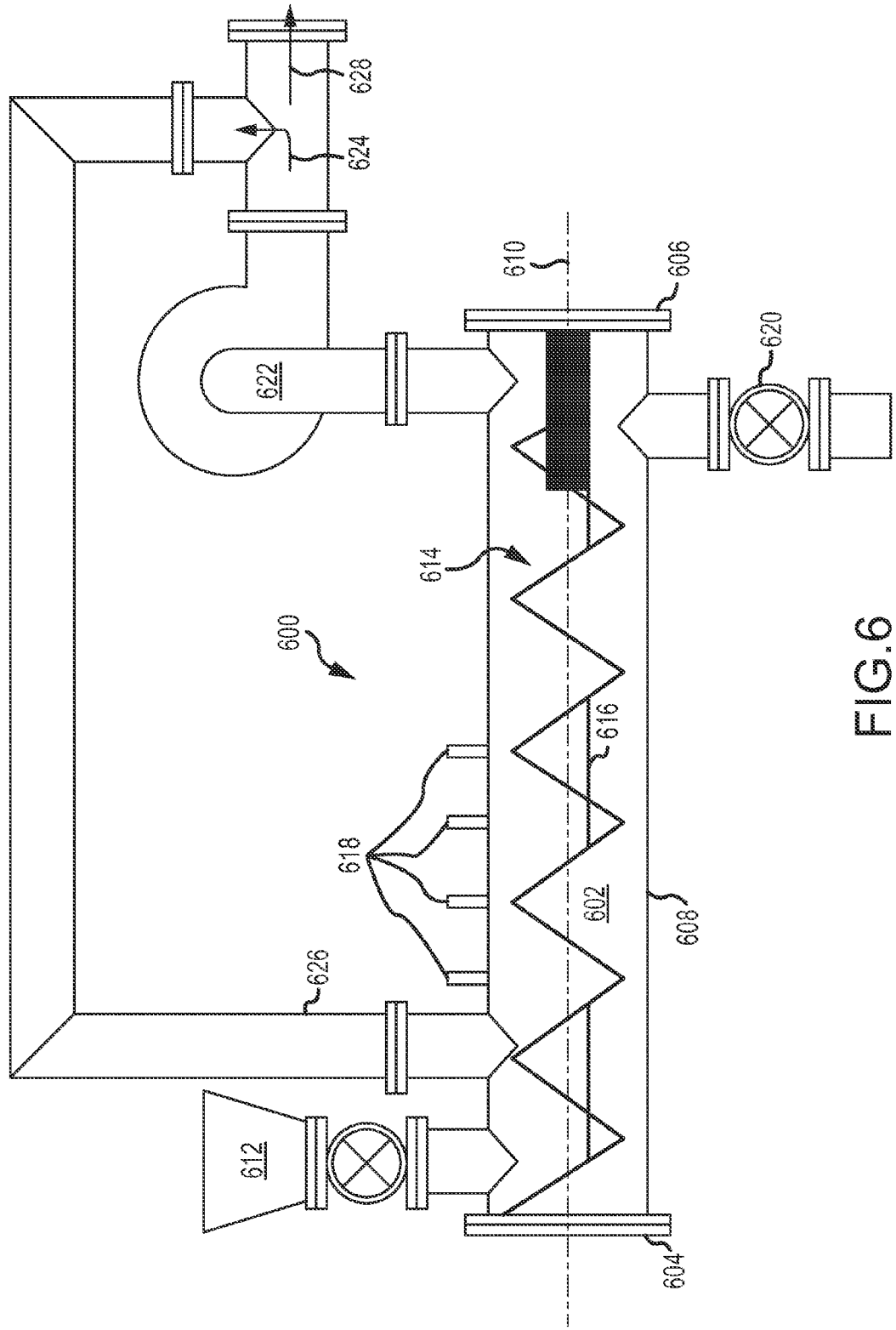
FIG. 6 is a schematic view of the apparatus of the present invention in accordance with another embodiment.

Another embodiment of the apparatus of the present invention is illustrated generally by the numeral 600 in FIG. 6. The apparatus is similar in construction to the apparatus of the embodiment of FIG. 4 and includes a primary reaction chamber or reactor 602 having a first end portion 604, a second end portion 606 and a body portion 608 formed intermediate the first and second end portions and extending generally circumferentially around an axis or centerline 610. A mechanical airlock 612 is mounted to the first end portion of the reactor and is adapted to receive and introduce biomass into the reaction chamber 602. A centerless screw auger or conveyor 614 is rotatably mounted in the reactor chamber extending substantially coaxially through the body portion 608 intermediate the end portions 604/606 thereof and includes a plurality of flights 616 structured and arranged to optimize the agitation and transfer of biochar from one end of the reactor to the other, thereby enhancing reaction and end product production efficiencies, as hereinabove described. In the embodiment of FIG. 6, Instead of having a single control valve mounted on the first end portion 604 of the chamber for delivering a high pressure jet of air along the axis 610, this embodiment includes a plurality of high pressure jets 618 mounted along the body portion of the reactor 602 which are structured and arranged to deliver streams of high pressure air into the chamber in a direction extending generally transversely to the chamber axis 610. The high pressure air streams cooperate with recirculated pyrolysis gases to heat feedstock material and to further enhance the efficiency of the pyrolysis reaction.

In a manner similar to that described above with respect to the embodiments of FIGS. 4 and 5, biochar is removed through a mechanical air lock 620 for either further processing or use in suitable applications in its present form. Gaseous by-products of the reaction are removed by suction of a blower 622, the gas stream being then divided into two separate streams—stream 624 (which is redirected back into the reaction chamber 602 via conduit 626), and stream 628, which is either burned off or collected for fuel or other applications. The blower also assists in controllably mixing the feedstock and atmosphere.

Figure 7C:
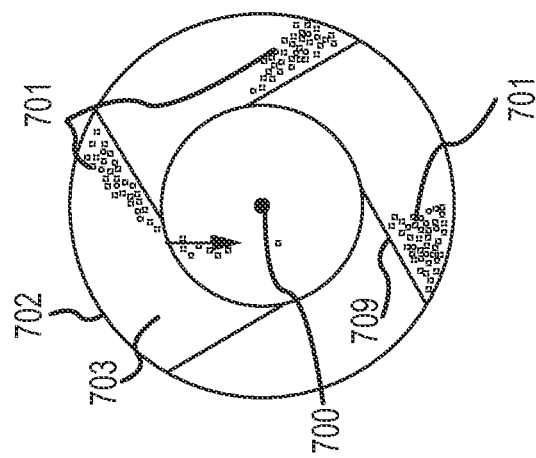
FIGS. 7 (a)-(c) are cross sectional view of portions of the embodiments of FIGS. 3 and 4 showing elements thereof in greater detail in accordance with various configurations thereof.
Figure 7B:
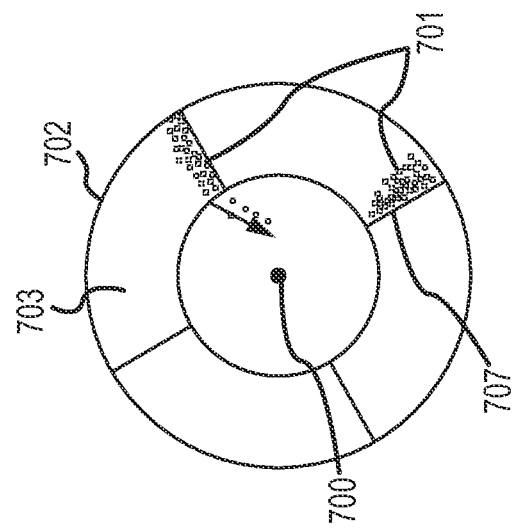
Figure 7A:
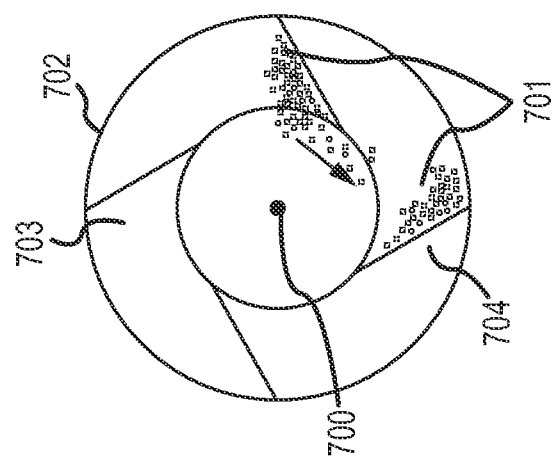

FIGS. 7(a)-7(c) illustrate various configurations of the centerless auger 414/514/614 of the system of the present invention and depict the manner in which each of the configurations affects material agitation. More specifically, the auger flights are generally secured thereto in a direction which is perpendicular to a centerline axis 700 of the auger. The flights are structured and arranged to lift and drop material or particles, shown generally at 701, through the reactor, and the angle of the flights relative to the wall 702 of the reactor body portion (reactor wall) determines the height to which materials in the reactor are lifted and, correspondingly, the time the particles spend falling through the reactor's airspace 703 under the influence of gravity and the agitation forces of the auger and gases in the chamber.

FIG. 7(a) illustrates a flight arranged with a leading edge 704 with respect to the reactor wall which lifts a relatively small amount of material 701 a short distance (less than 90° before dropping it off the flight, which results in a short amount of time the material or particles are suspended in the airspace. FIG. 7(b) illustrates a flight 707 which is positioned perpendicularly to the reactor wall 702. So arranged, flight 707 lifts the material 701 a vertical distance corresponding to more than 90° of the auger's rotation before dropping it off. A flight with a trailing edge such as shown at 709 in FIG. 7(c) lifts a relatively larger quantity of material 701 than lifted by the flight configurations described above through approximately 180° of rotation of the auger before dropping it off into the airspace near the top of the reactor. The action of flights so constructed causes the material to be suspended for a relatively long period of time in the reactor's airspace 703. Hence, the modification of the auger flights in accordance with the novel features of the instant invention as hereinabove described provides greater control over the pyrolization process than provided by conventional prior art systems.

By way of example and not of limitation, the flight configurations illustrated above in the embodiments of FIG. 7 depict flights having leading, perpendicular and trailing edges with respect to the reactor wall 702. One skilled in the art will appreciate that an auger having flights of selectively variable orientation with respect to the reactor wall may be employed to enhance reaction control without departing from the scope of the present invention.

The Process:

The methodology of the instant invention for the production of improved biochar material may be described as staged pyrolysis. Pyrolysis, either in the presence of oxygen or in an anaerobic atmosphere, occurs in several stages. These stages are drying, preheating, carbonization, char treatment, and gas treatment. Drying is the stage where moisture is removed from the feedstock. Heating is the stage where material is raised in temperature to the point where carbonization can occur (250-350° C.). Carbonization is the exothermic reaction of biomass as it decomposes to char (300-750° C.). Char treatment is the treatment of the carbonized product once it has been reacted, most simply cooling to ambient temperatures, but any quenching or inoculation as described below can be included in this process. Gas treatment is the use of the pyrolysis gas (and any liquids suspended within) subsequent to pyrolysis. Combustion of the gas is the most simple case, but collection of liquids, reforming, or catalytic conversion would be other examples. By separating these stages in accordance with the method of the present invention, control over each stage can be improved, and the use of heat for drying and heating can be made more efficient.

The first step in the improved carbonization process of the present invention is drying. Any biomass feedstock will, at some point, contain moisture, often in high amounts. Any moisture contained in the feedstock to be carbonized represents a significant amount of thermal mass that must be heated and would impair the pyrolysis reaction. The pyrolysis reaction is usually at peak efficiency if the moisture in the feedstock is between 0-5% water by weight although char can still be produced using a feedstock at a higher moisture percentage (moisture as high as 20% by wet weight has been used successfully). The reaction can continue at lower efficiency with higher moistures until the content of water in the material is too high to allow the pyrolysis reaction to be energetically favorable. Drying takes place below 180° C.

Feedstocks exists which react more efficiently or produce a higher yield of char when reacted at a moisture content above 5%. These materials contain a specific mix of chemical properties and physical size such that, were they bone dry, they would react more aggressively than desired. One example of such a material would be a pine chipping containing a large percentage of needles, bark and fines. If this is the case, then the objective of drying becomes drying the fuel to a specific, non-zero moisture content rather than drying it to a substantially zero moisture content.

The pyrolysis reaction begins at approximately 350° C.; although, the specific point varies depending on the material being carbonized. Although the pyrolysis reaction is exothermic, energy must be put into the fuel to bring it to reaction temperature. During the preheating the source material begins to undergo chemical changes, releasing chemically bound waters and organic volatiles and losing approximately 20% of the material's dry weight. The chemicals given off by preheating are considered a hazard and a waste product and, in the process described herein, they are entrained in the gas path and destroyed so that they do not become an environmental hazard. Accordingly, the methodology of the present invention includes two specific processes for pre-heating the material:

1. Direct contact heating: The most common means of preheating material in traditional gasification systems has been through direct contact with the material undergoing pyrolysis. In this case, the energy of the exothermic pyrolysis reaction is used to bring incoming material up to reaction temperatures.

2. External heating: Preheating the material in a separate space from pyrolysis using an external heating source can increase the speed and efficiency of the pyrolysis reaction, allowing a greater throughput of material from a reactor of a certain size. Energy for preheating can be supplied from any source such as electrical heating, combustion of propane, or solar radiation, but the most efficient and cost effective means would be through the use of heat from the combustion of production co-products or process waste products. Air that is motivated into the pyrolysis reactor moves through the pre-heating space so that gaseous products that are generated in pre-heating do not exit into the atmosphere. Heated material is moved to the pyrolysis reactor.

The carbonization step in the method herein disclosed occurs in a process known as flaming pyrolysis, in which biomass reacts with less than 25% of the oxygen that would be required for complete combustion. Biomass can be roughly modeled chemically as $CH_{1.4}O_{0.6}$. In the method of the present invention, oxygen in the air reacts first with volatile compounds driven off in pyrolysis and, secondarily, with the biomass, thus reducing the overall mass of the carbonized material in such a way that the final product has a higher concentration of carbon than the input biomass resulting in a biochar that can be roughly modeled as $CH_{0.4}O_{0.2}$ (exact chemical composition will vary across feedstocks and reactor conditions).

The specific properties of the carbonized product vary with the temperature of the reaction, so adjusting reaction temperature controls the final output, which can be desirable for creating a product for various, specific applications. A char produced at 700° C. will have higher adsorption and more fixed carbon, while a char made at 500° C. may have more of an immediate effect on soil conditions. In addition to optimizing run time process for biochar specific results run time conditions can be optimized and co-optimized for other objectives including but not limited to: co-product production, waste mitigation, air quality standards, run time equipment or operator needs, or cost to revenue maximization across all of the above listed.

Since the process is exothermic there are several ways to control the reaction temperature, and in practice they can be used:

1. Fuel moisture: By varying the moisture of an input feedstock, the temperature of the pyrolysis reaction can be controlled, since the water in the biomass will act as a thermal mass that will consume energy and lower the final reaction temperature.

2. Air/Biomass ratio: By limiting the amount of air for pyrolysis the reaction temperature can be lowered. Conversely, if a higher temperature is desired than a larger mass of air can be used to increase the temperature. In a similar fashion to controlling temperature with air mass, temperature can be controlled by increasing or decreasing the amount of biomass relative to the mass of incoming air. An increased mass of feedstock will decrease the reaction temperature because of the "richer" air/biomass ratio and—if direct contact preheating is used—the increased thermal load on the system. Conversely a reduced mass of feedstock will increase the temperature.

3. Stirring: Agitation in the area of reaction can be used to augment the temperature of the reaction by controlling the heat transfer from the carbonizing material to the incoming biomass. A complete lack of agitation results in a reaction zone with poor particle to particle heat transfer, resulting in small areas of material that must react at higher temperatures in order to impart heat to incoming particles. Overly aggressive agitation results in a lower temperature because of the increased thermal load of incoming biomass which pulls heat out of the reaction. Optimal stirring rates for a given temperature will vary by feedstock, but for softwoods, as an example, a reactor stirring rate between 0.5-2.0 rpm is optimal for producing a material from 500-700° C.

4. Char treatment: Once the biomass has been carbonized and removed from the reactor, various opportunities exist for post reactor treatment. Char treatment must be specified for the end use of the material, and the potential exists to use several treatments in preparation of the char. These potential treatments include:

a. Secondary carbonization: To ensure homogeneity in the final product and to increase its surface area, a secondary carbonization process may be required. A secondary carbonization process consists of holding the material at a temperature which is lower than the temperature of the initial carbonization process for a predetermined period of time to drive off volatile compounds. A use of a sweep gas can enhance the effectiveness of the secondary carbonization process.

b. Quenching: Quenching char is the process of cooling it to a temperature below 100° C. This can be accomplished in a number of ways but is most easily done by bringing the material into contact with water using a spray or dip. Inert gas and low temperature quenching are also possible.

c. Activation: Any process for the activation of charcoal could be integrated with the process as described herein to produce a final product of an activated carbon. Moreover activation could be driven by co-produced thermal energy from the production process.

d. Inoculation: A char product produced in accordance with the process of the present invention produces a good candidate material for inoculation with organisms desired by the end user. Inoculation can occur at or post quench of the charcoal.

e. Minerals or nutrient addition: The addition of minerals, nutrients, or other accelerants or additives is a special case for treatment of the final product. The addition can occur at any point in the process. While minerals can be added after carbonization, during the quench or inoculation, for example, it can also be beneficial to add minerals before carbonization. The most convenient example of materials addition is simply to not remove sands and clays from the biomass feedstock before charring, especially if the feedstock was removed from the same location that the resultant biochar will be applied. Nutrients may be added to the biochar process in the form of either organic or inorganic materials.

f. Nutrients can be added into the biochar process, nutrient can take the form of organic or inorganic materials.

5. Gas Combustion: In order to reduce waste products and potential environmental hazards, the pyrolysis gas stream and any wood tars must be completely combusted to produce an exhaust stream of $N_2$, $H_2O$, and $CO_2$. For this to be successful, it is important that the pyrolysis gas stream be kept above 300° C. so that volatile hydrocarbons such as wood tars do not condense prior to the combustion space.

System Equipment for Performing the Process:

1. Dryer: Drying is an important part of the novel and unique process of the present invention. However, the drying process can take place at many stages in production, and it may not be necessary to have a separate component for drying in the overall system, for example, if the feedstock has been dried at a previous point during its lifecycle. Examples of pre-dried feedstock include chipped, recycled wood product such as furniture or palates that have been dried for commercial use. When the drying step is required, the following methods for drying may be employed as steps to be included in the biochar procuring method herein disclosed:

a. Natural air dryer: In this method, a biomass feedstock is stored in a covered area where it is safe from elements such as rain and snow. Ambient air can move naturally over the material or be forced across or through to enhance the process.

b. Convective batch dryer: A more expedient method of drying material in a batch process than the natural air dryer, convective air batch drying requires storing a large volume of material and forcing heated air through it. Energy for heating the drying air can be supplied by combustion of pyrolysis gases in the combustor, as described above, or through the use of natural gas, propane, solar thermal, or any other more convenient or esoteric application of energy.

c. Continuous convective dryer: In many cases it may not be desirable to dry a large volume of material at once. In this case a continuous drying process should be used, in which material is conveyed through a region where hot gases accomplish drying. The company Belt-O-Matic (http://www.belt-o-matic.com/products.html) produces a number of such dryers that fit into the process described above.

It is to be understood that the foregoing drying methodologies are by way of example and not by limitation. A great variety of commercial drying solutions and well understood methods for drying biomass exist, all of which fit into the scope and intention of the process described above and which could work well with the equipment described herein.

2. Pre-heater: Like drying, the equipment for preheating the incoming biomass above drying temperatures to enhance carbonization is not necessary in all cases but can prove an effective addition to the central equipment. A number of configurations for equipment exist in which the preheating process can occur. In all cases, the process is open at two points, the inlet which is open to the atmosphere and the outlet which is open to the pyrolysis reactor. A draft is necessary co-current to material flow so that gases produced in heating are entrained in the pyrolysis gas path and do not become an environmental hazard. If a negative pressure design is used, this draft is induced through the pyrolysis reactor and the pre-heater is treated as the air inlet. If a positive pressure design is used, the draft is induced on the inlet side of the pre-heater.

3. Material transport apparatus:

a. Screw heater: Using a screw conveyor the biomass material can be drawn through a region that is heated externally, most efficiently by the combustion of pyrolysis gases. The desired rate and final temperature of heating can be controlled by screw speed.

b. Enclosed belt conveyor: Similar to the screw conveyor described above, and enclosed belt conveyor would use a metal belt to move material through a heating zone.

c. Gravity fed space: A gravity fed pre-heater is placed directly above the pyrolysis reactor. The design consists of a cylindrical space the material moves through which is stirred to ensure even heating. Heat is applied outside of the cylinder. Ideal dimensions will vary across types of feedstocks, but diameters from approximately 8-16 inches should generally be the most practical.

4. Primary carbonization reactor: The carbonization reactor consists of a horizontal or a vertical cylinder (depending upon the specific embodiment of the instant invention) in which air and biomass are introduced from the top and are fed down by gravity through a region there they react in the process described above to produce biochar and pyrolysis gas. Reactor dimensions can vary depending on desired materials and throughput, and although very small scales with reactors sized at just a few inches across are possible, in the preferred embodiment, production scale equipment is desired. Reactors from approximately 24-30 inches across have been used successfully.

a. Stirring: Stirring through the reactor plays an important role in process control and solids removal. A number of possible configurations for stirring are possible. By way of example, a 5 hp Nord electric motor that drives a gear and sprocket set reducing the final peak speed to 2.2 rpm through a central rod with five stirring arms has been used successfully.

a. Oxygen control: The amount of oxygen in the primary carbonization reactor can be controlled by the rate at which the blower pulls gas through the system and also by controlling the amount of air that is introduced to the system. While operating a reactor that is open to the atmosphere is desired in many applications, the reactor may operate under conditions where material is introduced via a mechanical airlock, and input oxygen is controlled through a separate control valve. Additional gas flow for gas disengagement of the carbonized material may be taken from a positive pressure side of a blower, thereby recalculating a portion of the gaseous pyrolysis by-product to provide the flow required to transport the particulate.

b. Refractory insulation: The use of refractory insulation around the carbonization reactor is necessary for operator safety and for peak efficiency of operation so that the majority of heat produced in pyrolysis is directed toward the heating of incoming feedstock. Aluminum heat shielding works well and a company called Unifrax (http://www.fiberfrax.com/) produces a ceramic fiber blanker called Fiberfrax which is very effective.

c. Ignition: in order to begin the reaction, material in the reactor must first be ignited. This can be accomplished through the use of an electric heater or though combustion of propane or other gas.

d. Other shapes: While the equipment described herein has been described as having a cylindrical reaction chamber, it is conceivable that a reaction chamber could be made in any shape, such as a rectangular or hexagonal prism, without departing from the scope of the present invention.

5. Mechanical disengagement: A mechanical disengagement mechanism may be used either in lieu of or in combination with a gas disengagement apparatus for removing the char from the reactor. A mechanical disengagement mechanism may be used where the carbonized pyrolysis by-product interacts or impinges upon solid objects. By way of example and not of limitation, by arranging the primary reactor above a secondary reactor and stirring the reaction mixture, the pyrolysis by-product material will fall into the secondary reactor where it may be removed by a screw conveyor.

6. Gas path insulation/heat shielding: In order to prevent to condensation of pyrolysis liquids and the settling of particles in the gas path, it is important that the temperature of the walls of the gas path be kept at a high temperature (over 200-300° C.). In order to do this the gas path must be insulated by some means. This can be done by using a double wall piping, heat shielding, fiber insulation or other of many means of insulation. Aluminum heat shielding works well and a company called Unifrax (http://www.fiberfrax.com/) produces a ceramic fiber blanker called Fiberfrax which is very effective.

7. Secondary carbonization reactor: If necessary to produce a material of a desired specification, a secondary carbonization reactor may be used to continue heating materials in an anaerobic environment. A well-insulated screw conveyor or large container may be advantageously employed for this application; although, any space that provides adequate heat, gas flow, and residence time will suffice. Additionally, un-carbonized biomass may be introduced into the secondary carbonization reactor through a mechanical airlock to increase total char produced and to create a final pyrolyzation by-product that contains properties of both high and low temperature chars. A secondary reactor employing approximately a ten to fifteen minute residence time at 400-500° C. with a 300-600 foot per minute sweep gas flow rate has demonstrated good results.

8. Char cooling: In order to halt any thermal reaction in the char and to reduce the pyrolysis by-product temperature to a range where the material can be handled safely, a separate cooling step may be required. Passive char cooling is achieved by moving the material to an airtight container and allowing the heat in the material to dissipate naturally. By contrast, active char cooling requires that either the material be moved through a space having a relatively large, cool surface area by mechanical means such as a water-cooled auger; that the material be quenched with a cool inert gas such as nitrogen or carbon dioxide; or that the material be quenched with water or another suitable quenching medium.

9. Fine particle collection: Due to the highly friable nature of biomass charcoal and the carbonization of fines in the feedstock, a large number of fine charcoal particles can be made in the carbonization process. These particles require a secondary particle collection point in the gas path. A number of well known solutions exist for the removal of fine particles from a gas stream, any of which can be applied for the process as described above. One proven example is a cyclone with a height of approximately 19.5 inches reducing from approximately 13 inches to approximately 4 inches. Any other cyclone sized so that fine particles are removed, or any other fine particle removal system, can be implanted in the device.

10. Particle removal: After collection, char particles must be removed from the coarse and fine particle collection sites. It is important that this process be gas-tight so that oxygen cannot enter the system at any point after the pyrolysis reaction. Screw conveyors or augers work well for this application. A screw conveyor may discharge into a closed container such as a 55 gallon barrel or discharge through a rotary air lock to prevent air entry. Individual conveyors can be used for each particle collection site and different conveyors can discharge by different means to different locations. One example is to have a dust collection auger discharge into a closed container that is changed between operational runs while a coarse particle auger discharges through a rotary air lock continuously.

11. Blower: The blower is the motivating force for the movement of air through the system. There are two options for placement of the blower, after the pyrolysis reactor pulling a negative pressure or before the pyrolysis reactor producing a positive pressure.

a. Negative pressure: The negative pressure blower will be exposed to higher temperatures and must move a larger volume of gas. This design has a lower cost of engineering for the same level of control of the pyrolysis reaction.

b. Positive pressure: A positive pressure system uses a lower volume blower at a higher pressure. For the same level of control there is a higher cost of engineering as a rotary air lock may be necessary.

12. Combustor: Many options for the final combustion of the pyrolysis gas exist that can be either purchased or engineered. Focus must be placed on appropriate air/fuel ratio and to air/fuel mixing to ensure a clean exhaust gas.

13. Process control: Internal operating conditions of the system equipment must be monitored to control the pyrolyzation process and to produce a final carbonaceous by-product that possess the desired characteristics and properties. The most critical parameters include temperatures of the gases and solids as they pass through various portions of the system and are exposed to gas streams. By way of example, thermocouples or other suitable heat-resistant temperature measuring devices provide the most reliable temperature measurements over a wide working temperature range, including the elevated temperatures found in the carbonization reactor chamber. Other operating conditions and/or parameters which must be monitored include operating pressure, gas composition and material flow rates. While process controls may be operated manually, for economic, safety and precision reasons, automatic controls and computerized data recording devices are preferred to manual.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method for the continuous exothermic production from raw, untreated biomass feedstock material of gaseous and solid carbonaceous pyrolysis by-products at a site where the feedstock exists and can be collected, the method employing a scalable, modular, mobile system including at least one modular unit including at least one primary fixed body reaction chamber, the reaction chamber being elongated, horizontal reaction chamber having a first end portion, a second end portion, an axis or centerline extending between the first and second end portions and along the gas flow path, a centerless screw auger rotatably mounted in the reaction chamber and extending substantially coaxially along the centerline intermediate the end portions and having a plurality of flights of selectively variable orientation with respect to a wall of the reaction chamber, a mechanical airlock for introducing gravity-fed biomass feedstock material into the reaction chamber, a control valve mounted on the first end portion of the reaction chamber for controllably admitting atmosphere along the axis of the chamber, and an apparatus for removing the carbonaceous pyrolysis by-products from the system, the apparatus for removing including a gas disengagement space, the by-products having physical properties and in quantities responsive to specific pyrolysis by-product market application requirements, the method comprising:

scaling the system up or down in response to market application requirements;

delivering the system to and installing the system at the site;

introducing gravity-fed biomass feedstock material into the at least one primary reaction chamber via the mechanical airlock;

introducing atmosphere into the at least one reaction chamber via the control valve;

generating and maintaining a negative pressure and suction force in the reaction chamber to stir and distribute the atmosphere, biomass feedstock, pyrolysis by-products in the reaction chamber;

establishing a selectively controllable stream of atmosphere flowing in a direction and along a gas flow path from the control valve to the apparatus for removing the pyrolysis by-products from the system;

heating the atmosphere and the feedstock in the at least one reaction chamber using an external heat source to dry the feedstock and to initiate an exothermic, self-sustaining pyrolysis by-product-producing reaction;

controllably stirring the biomass feedstock, the atmosphere and the gaseous and solid pyrolysis by-products in the at least one reaction chamber to sustain the exothermic pyrolysis reaction in a preselected operating temperature range and to control the physical properties and production quantities of the pyrolysis by-products in response to the market application requirements;

conveying the gaseous and solid pyrolysis by-products to the apparatus for removing the pyrolysis by-products from the system; and separating the gaseous and solid pyrolysis, by-products and removing them from the system.

2. The method of claim 1 further including the step of orienting each of the plurality of flights so that each flight is perpendicular with respect to the reaction chamber wall whereby the feedstock and pyrolysis by-product material is lifted through at least ninety degrees of rotation of the auger before it drops off the flight.

3. The method of claim 1 further including the step of orienting each of the plurality of flights so that each flight has a leading edge with respect to the reaction chamber wall whereby the feedstock and pyrolysis by-product material is lifted through approximately one hundred eighty degrees of rotation of the auger before it drops off the flight.

4. The method of claim 1 further including the step of orienting each of the plurality of flights so that each flight has a leading edge with respect to the reaction chamber wall whereby the feedstock and pyrolysis by-product material is lifted through less than ninety degrees of rotation of the auger before it drops off the flight.

5. A scalable, modular, mobile system for the continuous exothermic production from biomass feedstock material of gaseous and solid carbonaceous pyrolysis by-products having physical properties and in quantities responsive to specific pyrolysis by-product market application requirements, the system comprising:

at least one modular unit adapted to be scaled up or down in response to specific market application requirements, the at least one modular unit including:

an elongated, horizontal primary reaction chamber having a first end portion, a second end portion, an axis or centerline extending between the first and second end portions, and a body portion formed intermediate the first and second end portions and extending circumferentially around the axis;

a mechanical airlock for introducing gravity-fed biomass feedstock material into the reaction chamber;

an external heat source for initiating an exothermic pyrolysis reaction in the reaction chamber to produce the carbonaceous pyrolysis by-products under a first set of pyrolysis reaction conditions;

a selectively controllable blower for creating a negative pressure and a suction force in the reaction chamber, whereby the gravity-fed biomass feedstock, atmosphere and the gaseous and solid carbonaceous pyrolysis by-products are stirred and distributed within the reaction chamber;

a control valve for controllably admitting atmosphere into the reaction chamber in response to the negative pressure and suction force created by the blower, whereby the control valve and the blower cooperate with one another to control the amount of oxygen in the reaction chamber;

an internal mechanism for controllably agitating, stirring, mixing and conveying the feedstock material, the atmosphere and the solid and gaseous pyrolysis by-products within the reaction chamber whereby the exothermic reaction is sustained at a preselected operating temperature range without heat input from the external heat source and whereby the solid and gaseous pyrolysis by-products are conveyed through the reaction chamber by controlling the negative pressure and suction force generated by the blower to remove gaseous pyrolysis by-products; the internal mechanism for controllably agitating, mixing, stirring and conveying further including a centerless screw auger having a plurality of flights of a selectably variable orientation with respect to a wall of the reactor, the auger being rotatably mounted in the reactor chamber and extending substantially coaxially through the body portion intermediate the end portions; and an apparatus for removing the carbonaceous pyrolysis by-products from the system.

6. The system of claim 5 wherein the apparatus for removing the carbonaceous pyrolysis by-products from the system comprises an air lock for removing the solid carbonaceous pyrolysis by-products.

7. The system of claim 6 including a combustion chamber operatively connected to the blower and adapted to burn gaseous pyrolysis by-products whereby a clean exhaust is generated.

8. The system of claim 6 including an apparatus operatively connected to the blower for redirecting at least a portion of the gaseous pyrolysis by-products to the reaction chamber.

9. The system of claim 5 where each of the plurality of flights is secured to the auger so that each flight has a leading edge with respect to the reactor whereby the feedstock and pyrolysis by-product material is lifted through less than ninety degrees of rotation of the auger before it drops off the flight.

10. The system of claim 5 where each of the plurality of flights is secured to the auger so that each flight is perpendicular with respect to the reactor whereby the feedstock and pyrolysis by-product material is lifted through at least ninety degrees of rotation of the auger before it drops off the flight.

11. The system of claim 5 where each of the plurality of flights is secured to the auger so that each flight has a trailing edge with respect to the reactor whereby the feedstock and pyrolysis by-product material is lifted through approximately one hundred eighty degrees of rotation of the auger before it drops off the flight.

12. A scalable, modular, mobile system for the continuous exothermic production from biomass feedstock material of gaseous and solid carbonaceous pyrolysis by-products having physical properties and in quantities responsive to specific pyrolysis by-product market application requirements, the system comprising:
   at least one modular unit adapted to be scaled up or down in response to specific market application requirements, the at least one modular unit including:
   an upright vertical primary fixed body reaction chamber;
   a mechanical airlock for introducing gravity-fed biomass feedstock material into the reaction chamber;
   an external heat source for initiating an exothermic pyrolysis reaction in the reaction chamber to produce the carbonaceous pyrolysis by-products under a first set of pyrolysis reaction conditions;
   a selectively controllable blower for creating a negative pressure and a suction force in the reaction chamber, whereby the gravity-fed biomass feedstock, atmosphere and the gaseous and solid carbonaceous pyrolysis by-products are stirred and distributed within the reaction chamber;
   a control valve for controllably admitting atmosphere into the reaction chamber in response to the negative pressure and suction force created by the blower, whereby the control valve and the blower cooperate with one another to control the amount of oxygen in the reaction chamber;
   a gas disengagement space extending annularly around the primary reaction chamber and being operatively connected thereto and to the blower for controllably removing the solid and gaseous pyrolysis by-products from the reaction chamber, the gas disengagement space including an airlock for introducing additional biomass therein, an outer wall comprising a refractory shielding insulation layer structured and arranged to contain reaction process heat to maintain peak operating efficiency and having a preselected area structured to cooperate with the negative pressure and suction force created by the blower to control the rate at which the by-products are removed;
   an internal mechanism for controllably agitating, stirring, mixing and conveying the feedstock material, the atmosphere and the solid and gaseous pyrolysis by-products within the reaction chamber whereby the exothermic reaction is sustained at a preselected operating temperature range without heat input from the external heat source and whereby the solid and gaseous pyrolysis by-products are conveyed to the gas disengagement space; and
   an apparatus for removing the carbonaceous pyrolysis by-products from the system.

13. The system of claim 12 wherein the preselected area of the gas disengagement space is approximately 300 square inches to approximately 550 square inches.

14. The system of claim 12 wherein the apparatus for removing the carbonaceous pyrolysis by-products includes a gas-tight collection chamber.

15. The system of claim 14 wherein the carbonaceous pyrolysis by-products include coarse particles and fine particles and wherein the collection chamber includes a baffle structured to separate the coarse particles from the fine particles.

16. The system of claim 14 wherein the gas-tight collection chamber is structured and arranged to define a secondary fixed body pyrolysis reaction chamber separated from the primary reaction chamber and wherein the pyrolysis by-products continue to undergo a pyrolysis reaction under a second set of pyrolysis reaction conditions.

17. The system of claim 14 wherein the gas-tight collection chamber includes an airlock for introducing additional biomass therein.

18. The system of claim 14 wherein the gas-tight collection chamber comprises an upright secondary reactor operatively connected to the primary reaction chamber.

19. The system of claim 12 wherein the apparatus for removing the carbonaceous pyrolysis by-products from the system includes an air-tight screw auger.

20. The system of claim 19 wherein the apparatus for removing the carbonaceous pyrolysis by-products from the system further includes a gas-tight cyclone having first and second end portions, the first end portion being connected to the blower and the second end portion being connected to a collection box.

21. The system of claim 20 including an apparatus for removing solid carbonaceous pyrolysis by-products from the collection box.

22. The system of claim 20 including a combustion chamber operatively connected to the blower and adapted to burn gaseous pyrolysis by-products whereby a clean exhaust is generated.

23. The system of claim 22 including an apparatus operatively connected to the blower for redirecting at least a portion of the gaseous pyrolysis by-products to the reaction chamber.

24. A scalable, modular, mobile system for the continuous exothermic production from biomass feedstock material of gaseous and solid carbonaceous pyrolysis by-products having physical properties and in quantities responsive to specific pyrolysis by-product market application requirements, the system comprising:
   at least one modular unit adapted to be scaled up or down in response to specific market application requirements, the at least one modular unit including:
   a primary fixed body reaction chamber;
   a mechanical air lock for introducing gravity-fed biomass feedstock material into the reaction chamber;

an external heat source for initiating an exothermic pyrolysis reaction in the reaction chamber to produce the carbonaceous pyrolysis by-products under a first set of pyrolysis reaction conditions;

a selectively controllable blower for creating a negative pressure and a suction force in the reaction chamber, whereby the gravity-fed biomass feedstock, atmosphere and the gaseous and solid carbonaceous pyrolysis by-products are stirred and distributed within the reaction chamber;

a control valve for controllably admitting atmosphere into the reaction chamber in response to the negative pressure and suction force created by the blower, whereby the control valve and the blower cooperate with one another to control the amount of oxygen in the reaction chamber;

a gas disengagement space extending annularly around the reaction chamber and operatively connected thereto and to the blower for controllably removing the solid and gaseous pyrolysis by-products from the reaction chamber, the gas disengagement space including an airlock for introducing additional biomass therein and further having a preselected area structured to cooperate with the negative pressure and suction force created by the blower to control the rate at which the by-products are removed;

an internal mechanism for controllably agitating, stirring, mixing and conveying the feedstock material, the atmosphere and the solid and gaseous pyrolysis by-products within the reaction chamber whereby the exothermic reaction is sustained at a preselected operating temperature range without heat input from the external heat source and whereby the solid and gaseous pyrolysis by-products are conveyed to the gas disengagement space by controlling the negative pressure and suction force generated by the blower to remove gaseous pyrolysis by-products; and an apparatus for removing the carbonaceous pyrolysis by-products from the system.

25. A scalable, modular, mobile system for the continuous exothermic production from biomass feedstock material of gaseous and solid carbonaceous pyrolysis by-products having physical properties and in quantities responsive to specific pyrolysis by-product market application requirements, the system comprising:

at least one modular unit adapted to be scaled up or down in response to specific market application requirements, the at least one modular unit including:

a primary fixed body reaction chamber;

a mechanical airlock for introducing gravity-fed biomass feedstock material into the reaction chamber;

an external heat source for initiating an exothermic pyrolysis reaction in the reaction chamber to produce the carbonaceous pyrolysis by-products under a first set of pyrolysis reaction conditions;

a selectively controllable blower for creating a negative pressure and a suction force in the reaction chamber, whereby the gravity-fed biomass feedstock, atmosphere and the gaseous and solid carbonaceous pyrolysis by-products are stirred and distributed within the reaction chamber;

a control valve for controllably admitting atmosphere into the reaction chamber in response to the negative pressure and suction force created by the blower, whereby the control valve and the blower cooperate with one another to control the amount of oxygen in the reaction chamber;

a gas disengagement space extending annularly around the reaction chamber and operatively connected thereto and to the blower for controllably removing the solid and gaseous pyrolysis by-products from the reaction chamber, the gas disengagement space having a preselected area structured to cooperate with the negative pressure and suction force created by the blower to control the rate at which the by-products are removed;

an internal mechanism for controllably agitating, stirring, mixing and conveying the feedstock material, the atmosphere and the solid and gaseous pyrolysis by-products within the reaction chamber whereby the exothermic reaction is sustained at a preselected operating temperature range without heat input from the external heat source and whereby the solid and gaseous pyrolysis by-products are conveyed to the gas disengagement space by controlling the negative pressure and suction force generated by the blower to remove gaseous pyrolysis by-products and an apparatus for removing the carbonaceous pyrolysis by-products from the system, the removing apparatus including a gas-tight collection chamber, the gas-tight collection chamber further including an airlock for introducing additional biomass therein.

26. A scalable, modular, mobile system for the continuous exothermic production from biomass feedstock material of gaseous and solid carbonaceous pyrolysis by-products having physical properties and in quantities responsive to specific pyrolysis by-product market application requirements, the system comprising:

at least one modular unit adapted to be scaled up or down in response to specific market application requirements, the at least one modular unit including:

a primary fixed body reaction chamber;

a mechanical airlock for introducing gravity-fed biomass feedstock material into the reaction chamber;

an external heat source for initiating an exothermic pyrolysis reaction in the reaction chamber to produce the carbonaceous pyrolysis by-products under a first set of pyrolysis reaction conditions;

a selectively controllable blower for creating a negative pressure and a suction force in the reaction chamber, whereby the gravity-fed biomass feedstock, atmosphere and the gaseous and solid carbonaceous pyrolysis by-products are stirred and distributed within the reaction chamber;

a control valve for controllably admitting atmosphere into the reaction chamber in response to the negative pressure and suction force created by the blower, whereby the control valve and the blower cooperate with one another to control the amount of oxygen in the reaction chamber;

a gas disengagement space extending annularly around the reaction chamber and operatively connected thereto and to the blower for controllably removing the solid and gaseous pyrolysis by-products from the reaction chamber, the gas disengagement space including an airlock for introducing additional biomass therein and further having a preselected area structured to cooperate with the negative pressure and suction force created by the blower to control the rate at which the by-products are removed;

an internal mechanism for controllably agitating, stirring, mixing and conveying the feedstock material, the atmosphere and the solid and gaseous pyrolysis by-products within the reaction chamber whereby the exothermic reaction is sustained at a preselected operating temperature range without heat input from the external heat source and whereby the solid and gaseous pyrolysis by-products are conveyed to the gas disengagement space by controlling the negative pressure and suction force generated by the blower to remove gaseous pyrolysis by-products;

an apparatus for removing the carbonaceous pyrolysis by-products from the system, the removing apparatus including an airtight screw augur and a gas-tight cyclone having first and second end portions, the first end portion being connected to the blower and the second end portion being connected to a collection box; and an apparatus operatively connected to the blower for redirecting at least a portion of the gaseous pyrolysis by-products to the reaction chamber.

* * * * *